United States Patent [19]

Rotgans

[11] Patent Number: 5,055,848

[45] Date of Patent: Oct. 8, 1991

[54] RADAR APPARATUS FOR THE DETECTION OF HELICOPTERS

[75] Inventor: Petrus J. Rotgans, Hengelo, Netherlands

[73] Assignee: Hollandse Signaalapparaten B.V., Hengelo, Netherlands

[21] Appl. No.: 657,571

[22] Filed: Feb. 19, 1991

[30] Foreign Application Priority Data

Feb. 23, 1990 [NL] Netherlands .......................... 9000437

[51] Int. Cl.⁵ .............................................. G01S 7/30
[52] U.S. Cl. ........................................ 342/90; 342/91
[58] Field of Search .................................. 342/90, 91

[56] References Cited

U.S. PATENT DOCUMENTS 4,074,264  2/1978  Wilmonti ............................... 342/90
4,845,500  7/1989  Cornett et al. ......................... 342/90

Primary Examiner—Mark Hellner

[57] ABSTRACT

The invention relates to a radar apparatus provided with a detection unit, which determines the positions (12) of objects incorporating fast moving parts, such as helicopters. The detection unit thereto comprises a first range-azimuth area (3), a trend estimation and standard deviation calculation unit (5), a threshold (8), a second range-azimuth area (9) and a clusterer (11).

5 Claims, 3 Drawing Sheets

RADAR APPARATUS FOR THE DETECTION OF HELICOPTERS

BACKGROUND OF THE INVENTION

The invention relates to a radar apparatus, provided with an antenna, a transmitting unit, a receiving unit and a detection unit which, for objects incorporating fast moving parts, such as helicopters, determines the positions of these objects on the basis of successive measurements, whereby the measuring values, via a first range-azimuth memory, are applied in groups to the detection unit which, per group, can generate a detection, which detections are applied to a second range-azimuth memory; further provided with a clusterer which determines the positions of individual detections or clusters of detections in the second range-azimuth memory and delivers these positions for further processing.

A radar apparatus of this kind is known from U.S. Pat. No. 4,389,647. In the above-mentioned radar apparatus, the radar parameters, like pulse repetition frequency and antenna rotation speed, have been selected such that the blade flashes become visible. These blade flashes are strong radar echoes which are produced at the moment that the rotor blades are perpendicular to the radar beam, making good radar reflectors.

For a conventional surveillance radar, the radar parameters are selected on entirely different grounds. So it logically follows that such a surveillance radar does not, or only insufficiently, detect the above blade flashes, which precludes these blade flashes from being made the basis for a detection principle. The detection probability is small.

The invention has for its object to provide a solution to this problem. The invention is based on the observation that when the strength of a target reflection is measured with a number of radar pulses and the standard deviation is determined on the basis of the resulting measuring values, theis standard deviation is unexpectedly large when the target is a helicopter.

This is also the case, if the measurements are performed with a conventional search radar. Special provisions, however, will have to be made to compensate for the effect of the antenna rotation.

The invention is a radar apparatus provided with a detection unit, which operates on the basis of the above-mentioned observation.

The invention is particularly suitable to be used as a search radar, but it can also be used advantageously in other radar applications, whereby the radar beam dwells on the target only for a brief period.

SUMMARY OF THE INVENTION

The invention is characterised in that the detection unit is also provided with:

i. a trend estimation unit which, for the measuring values in a group, estimates the effect of the possible movement of the antenna, in this way generating a best fitting trend line;

ii. a standard deviation calculation unit which, for the measuring values in a group, calculates the standard deviation of the measuring values relative to the trend line of this group, in this way generating a standard deviation value;

iii. a threshold unit which, for each group, compares the standard deviation value with a threshold value, which is at least dependent on an average noise level in the receiving unit and which generates a detection when exceeded.

BRIEF DESCRIPTION OF THE DRAWINGS

The invention will now be further described with reference to the following figures, of which.

DETAILED DESCRIPTION OF THE INVENTION

In the explanation it has been assumed that the radar system in question is a search radar, whose output is connected to a two-dimensional memory, the range-azimuth area. Each range-azimuth cell contains the radar-echo strength for the relevant range and direction. Each antenna revolution the range-azimuth area is refreshed. The detection unit is a signal processor which scans the range-azimuth area for rapid fluctuations in the radar-echo strength. Such fluctuations are characteristic for helicopters and other objects incorporating fast moving parts. To this end, the range-azimuth area is divided into groups and the standard deviation of the radar-echo signals is calculated. For a helicopter a large standard deviation is expected. There are however two distrubing factors here which make it difficult to arrive at an unambiguous conclusion and which require complementary measures to be taken. The first disturbing factor is the thermal noise, inherent in a radar signal. This noise contributes to the deviation. The second disturbing factor is the variation of the radar echo strength as a result of the rotating movement of the antenna. If no supplementary measures are taken, this variation will also contribute to the deviation, which may mask the additional deviation, typical of a helicopter.

Figure 1:
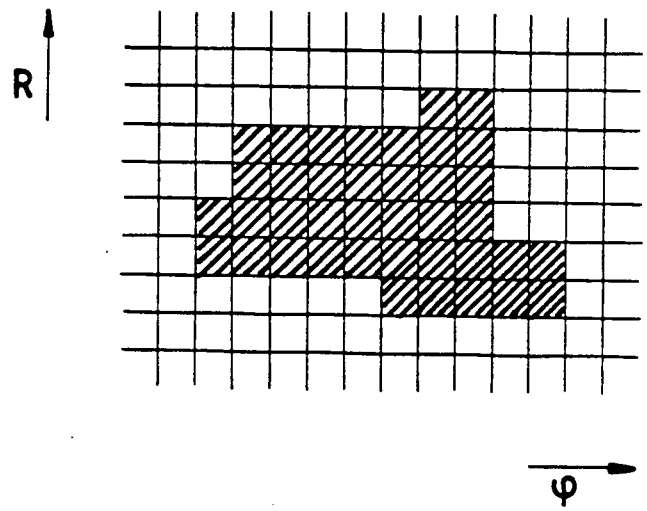
FIG. 1 is a diagram of a range-azimuth area, the shaded part representing a helicopter.

FIG. 1 illustrates the range-azimuth area in which the outline of a helicopter is marked as detected by the radar. Each shaded range-azimuth cell has an associated target strength, determined by the radar. Until the detection unit is applied to this range-azimuth area, it is not clear whether a helicopter or any other object is involved here.

Figure 2:
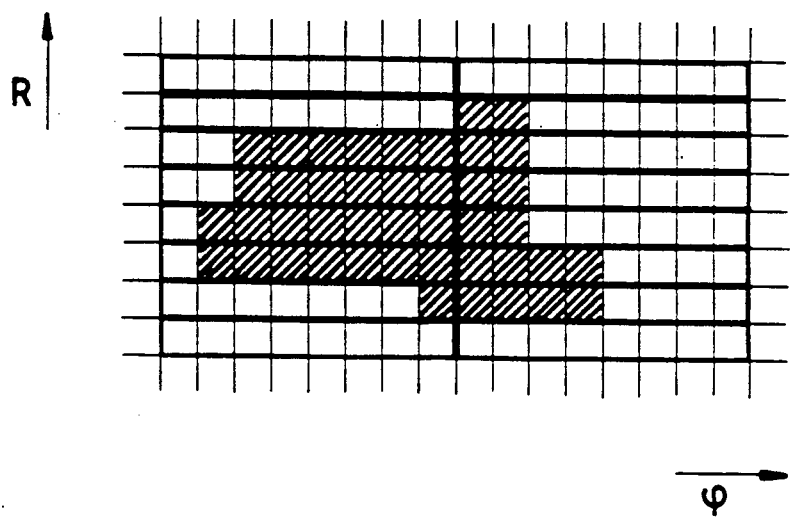
FIG. 2 illustrates the same diagram, now showing the groups within which the standard deviation is calculated.

FIG. 2 shows the way in which the range-azimuth area is divided into groups, within which the deviation is calculated. In this example the dimensions of the group are $1 \times 8$, although, subject to radar parameters such as pulse repetition frequency and rotation speed, different dimensions can be chosen.

The calculated deviation is compared with a threshold value, which depends on the noise level in the radar receiver. In case the threshold value is exceeded, it is tentatively concluded that we are dealing with a helicopter and a detection for this group will be generated.

Figure 3:
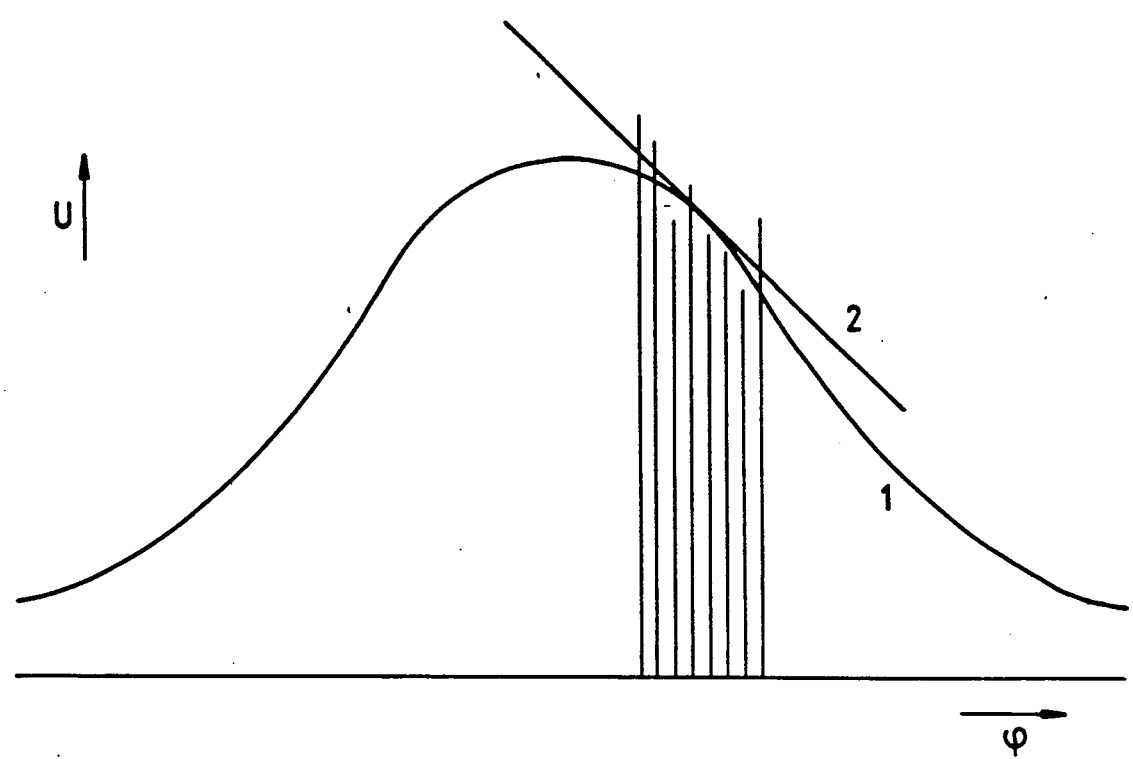
FIG. 3 shows the effect of the antenna movement on the target strength.

In FIG. 3 curve 1 presents the theoretical effect of the antenna movement of a search radar on the measured target strength U as a function of the azimuth for a random object. Furthermore, eight measuring values of the target strength are given, which together form a group. With 2, a straight line, the trend estimator, obtained on the basis of the least square approximation method, is given. By calculating the deviation of the measuring values with respect to this line, the effect of the antenna movement of the deviation is substantially eliminated.

Figure 4:
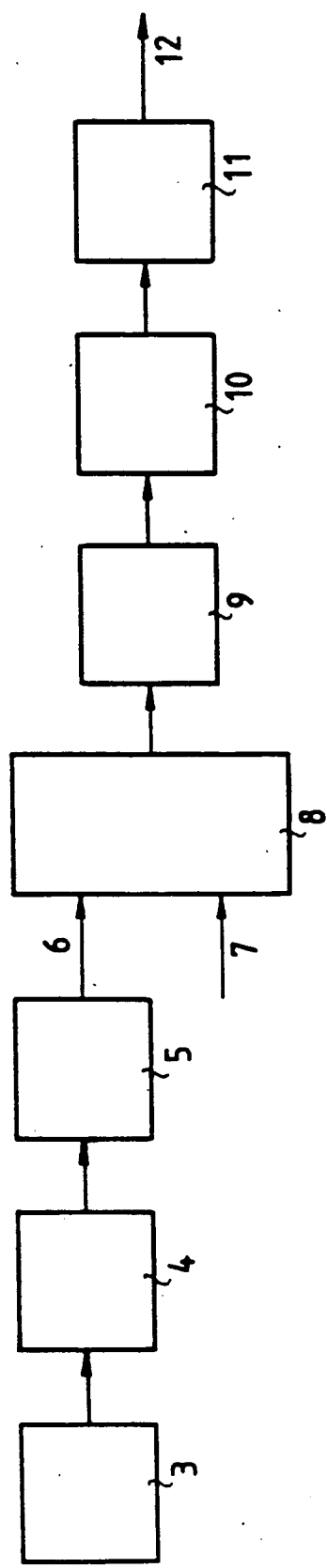
FIG. 4 is a block diagram of the detection unit.

FIG. 4 presents the block diagram of the detection unit. In a first range-azimuth area 3, the radar writes the measured target strength per range-azimuth cell. Such an area is required because the filling of this area occurs per radar sweep, hence in the range direction, whereas a trend estimation and deviation calculation unit 5, via selector 4, reads the area in groups in the azimuth direction. The trend estimation and standard deviation calculation unit 5 includes special provisions to compensate for the antenna rotation. Owing to this rotation, the successive measuring values will continuously change. These changes may contribute to the deviation and will mask the additional deviation, typical of a helicopter. Therefore, a trend line is plotted on the basis of the measuring values, present within a group, starting from the known shape of the antenna beam, and the standard deviation of the measuring values is determined with respect to this calculated trend line. A simple trend line is a straight line, derived from the measuring values in the group, estimated on the basis of the least square approximation method.

With a radar apparatus whose antenna is stationary while the measuring values, present within a group, are collected, the trend line is the zero line.

The trend estimator and standard deviation calculation unit 5 produces per group the standard deviation 6 of these target strengths. Also supplied is the average noise strength 7, which is inherently available in a radar receiver, e.g. for the automatic gain control. The above measuring values are supplied to a threshold circuit 8. The threshold circuit can generate a detection per group, depending on the fact whether the calculated standard deviation has exceeded the threshold value, formed by the average noise strength in the radar receiver multiplied by a constant factor, used for setting the false alarm rate. The detections generated by threshold circuit 8 are written in a second range-azimuth area 9. Via selector 10, the clusterer 11 reads theis area 9 and determines position 12, related to a detection or a cluster of detections.

I claim:

1. Radar apparatus, provided with an antenna, a transmitting unit, a receiving unit and a detection unit which, for objects incorporating fast moving parts, such as helicopters, determines the positions of these objects on the basis of a number of successive measurements, whereby the measuring values, via a first range-azimuth memory, are applied in groups to the detection unit which, per group, can generate a detection, which detections are applied to a second range-azimuth memory; further provided with a clusterer which determines the position of individual detections or clusters of detections in the second range-azimuth memory and delivers these positions for further processing, characterised in that the dectection unit is also provided with:
   i. a trend estimation unit which, for the measuring values in a group, estimates the effect of the possible movement of the antenna, in this way generating a best fitting trend line;
   ii. a standard deviation calculation unit which, for the measuring values in a group, calculates the standard deviation of the measuring values relative to the trend line of this group, in this way generating a standard deviation value;
   iii. a threshold unit which, for each group, compares the standard deviation value with a threshold value, which is at least dependent on an average noise level in the receiving unit and which generates a detection when exceeded.

2. Radar apparatus as claimed in claim 1, characterised in that the trend line is estimated on the basis of the least square approximation method.

3. Radar apparatus as claimed in claim 1 or 2, characterised in that the groups are disjunct.

4. Radar apparatus as claimed in claim 1 or 2, characterised in that the groups partly overlap.

5. Radar apparatus as claimed in one of the above-mentioned claims, characterised in that the groups have a length of only one range cell.

* * * * *